United States Patent
Hewitt et al.

(10) Patent No.: US 10,956,378 B2
(45) Date of Patent: Mar. 23, 2021

(54) HIERARCHICAL FILE TRANSFER USING KDE-OPTIMIZED FILESIZE PROBABILITY DENSITIES

(71) Applicant: International Business Machines Corporation, Armonk, NY (US)

(72) Inventors: Trudy L. Hewitt, Cary, NC (US); Jonathan Dunne, Dungarvan (IE); Jana H. Jenkins, Raleigh, NC (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/114,981

(22) Filed: Aug. 28, 2018

(65) Prior Publication Data

US 2020/0073963 A1  Mar. 5, 2020

(51) Int. Cl.
*G06F 3/06* (2006.01)
*G06F 16/185* (2019.01)
(Continued)

(52) U.S. Cl.
CPC ............ *G06F 16/185* (2019.01); *G06F 3/067* (2013.01); *G06F 3/0619* (2013.01);
(Continued)

(58) Field of Classification Search
CPC ...... G06F 3/0619; G06F 3/067; G06F 3/0644; G06F 17/18; G06F 16/162; G06F 16/17;
(Continued)

(56) References Cited

U.S. PATENT DOCUMENTS 6,378,054 B1  4/2002  Karasudani et al.
8,924,352 B1  12/2014  Andress et al.
(Continued)

OTHER PUBLICATIONS

Heinz et al., ("Toward Kernel Density Estimation over Streaming Data", Department of Mathematics and Computer Science University of Marbug Germany, International Conference on Management of Data COMAD 2006, Delhi, India, Dec. 14-16, 2006, Computer Society of India, 2006, 12 pages).*

(Continued)

*Primary Examiner* — Hicham Skhoun
(74) *Attorney, Agent, or Firm* — Schmeiser, Olsen & Watts; Stephanie Carusillo

(57) ABSTRACT

A file-management system of a computer operating system transfers a hierarchical set of files. The system generates a histogram of the files' true filesizes, using a non-parametric kernel-density estimation (KDE) procedure to estimate the width of each histogram bin. The system splits the fileset into subsets and generates a second-level histogram to represent the true-filesize distribution of each subset, using the previously estimated kernel width to initialize another KDE procedure for each second-level histogram. The distributions identified by each second-level histogram are used to organize the file transfer into a series of passes, each of which completely transfers a group of files that together fit into the computer's I/O buffer minimal wasted space. A waypoint is set at the beginning of each pass and if the system is interrupted mid-transfer, no file transferred before the most recent waypoint is lost.

20 Claims, 5 Drawing Sheets

(51) Int. Cl.
  *H04L 29/08* (2006.01)
  *G06F 17/18* (2006.01)
  *G06F 16/17* (2019.01)
  *G06F 16/16* (2019.01)
(52) U.S. Cl.
  CPC .......... *G06F 3/0644* (2013.01); *G06F 16/162* (2019.01); *G06F 16/17* (2019.01); *G06F 17/18* (2013.01); *H04L 67/06* (2013.01)
(58) Field of Classification Search
  CPC .......... G06F 16/185; G06F 17/30; G06F 3/06; H04L 67/06; H04L 29/08
  USPC ....................................................... 707/821
  See application file for complete search history.

(56) References Cited

U.S. PATENT DOCUMENTS

| | | | |
|---|---|---|---|
| 2005/0083849 A1 | 4/2005 | Rui et al. | |
| 2005/0114103 A1* | 5/2005 | Han | G06F 17/18 |
| | | | 703/2 |
| 2008/0313188 A1* | 12/2008 | Hu | H04L 67/14 |
| 2012/0166140 A1* | 6/2012 | Weber | G06K 9/6212 |
| | | | 702/180 |
| 2014/0067275 A1* | 3/2014 | Jing | G06K 9/6222 |
| | | | 702/19 |
| 2014/0289189 A1 | 9/2014 | Chan et al. | |
| 2014/0351531 A1 | 11/2014 | Puttaswamy Naga et al. | |
| 2015/0029213 A1 | 1/2015 | Benson et al. | |
| 2015/0278024 A1 | 10/2015 | Barman et al. | |
| 2018/0017467 A1* | 1/2018 | Hiruta | G05B 23/0254 |
| 2019/0311220 A1* | 10/2019 | Hazard | G06K 9/6226 |

OTHER PUBLICATIONS

Raymond.CC, "15 Free File Copy Tools Tested for the Fastest Transfer Speeds." [Accessed Mar. 14, 2018] https://www.raymond.cc/blog/12-file-copy-software-tested-for-fastest-transfer-speed/, 17 pages.

H. Mangalam, "How to transfer large amounts of data via network." Oct. 19, 2017. [Accessed Mar. 14, 2018] http://moo.hac.uci.edu/~hjm/HOWTO_move_data.html, 24 pages.

B. Allcock et al., "Data management and transfer in high-performance computational grid environments." Parallel Computing, vol. 28, Issue 5, May 2002, pp. 749-771.

S. Park et al., "Dynamic Data Grid Replication Strategy Based on Internet Hierarchy." 2004. In: Li M., Sun XH., Deng Q., Ni J. (eds) Grid and Cooperative Computing. GCC 2003. Lecture Notes in Computer Science, vol. 3033. Springer, Berlin, Heidelberg, 9 pages.

W. Liu et al., "A data transfer framework for large-scale science experiments." In Proceedings of the 19th ACM International Symposium on High Performance Distributed Computing (HPDC '10). ACM, New York, NY, USA, 717-724. 2010.

* cited by examiner

HIERARCHICAL FILE TRANSFER USING KDE-OPTIMIZED FILESIZE PROBABILITY DENSITIES

BACKGROUND

The present invention relates in general to computerized technologies that store data, and in particular technologies that transfer stored computer files from one location to another. In this document, the term "files" should be construed to include discrete files, other types of data objects and structure, disk folders, partitions, disk images, databases, virtualized resources, and other types of computerized entities capable of being electronically transferred from one computerized location to another.

Known methods of moving or copying a set of files can transfer files one by one or may group files into subsets and then transfer the subsets one by one. In general, known technologies do not attempt to optimize the organization of files into subsets or the order in which files or subsets are transferred, nor do they allow users to manually configure these settings.

SUMMARY

An embodiment of the present invention is a file-management system of a computer that responds to a request to transfer a fileset from a source location to a destination location with a method for hierarchical file transfer using KDE-optimized filesize probability densities that includes:

generating a fileset histogram that approximates a probability-density distribution of filesizes of all files in the fileset, using a non-parametric kernel-density estimation (KDE) procedure to assign of the fileset histogram an identical fileset kernel width;

dividing the fileset into a mutually exclusive plurality of subsets as a function of the fileset histogram and of the total capacity of one or more I/O buffers that will be used by the computer to perform the requested file transfer;

producing a set of subset histograms that each approximate a probability-density distribution of filesizes of all files in a corresponding subset of the plurality of subsets, where every bin of each histogram of the subset histograms has an identical kernel width, specific to that histogram, that is selected by a second-level application of the KDE procedure to a filesize probability-density distribution of a corresponding subset of the plurality of subsets;

partitioning each subset of the plurality of subsets into a corresponding plurality of pass groups, where files identified by each pass group are selected as functions of the capacity of the I/O buffer and of a subset histogram that characterizes the subset from which the first group is partitioned, and where each group identifies a collection of files that can simultaneously fit into the I/O buffer with minimal unused buffer space; and initiating a multi-pass file-transfer procedure that transfers the fileset to the destination location in a sequential series of passes, where each pass fully transfers all files comprised by one group of the pluralities of pass groups, and where an interruption to the file-transfer procedure during a partially completed pass of the series of passes does not result in loss of any file transferred during a previous pass.

Another embodiment of the present invention is a method for hierarchical file transfer using KDE-optimized filesize probability densities. This method includes:

generating a fileset histogram that approximates a probability-density distribution of filesizes of all files in the fileset, using a non-parametric kernel-density estimation (KDE) procedure to assign of the fileset histogram an identical fileset kernel width;

dividing the fileset into a mutually exclusive plurality of subsets as a function of the fileset histogram and of the total capacity of one or more I/O buffers that will be used by the computer to perform the requested file transfer;

producing a set of subset histograms that each approximate a probability-density distribution of filesizes of all files in a corresponding subset of the plurality of subsets, where every bin of each histogram of the subset histograms has an identical kernel width, specific to that histogram, that is selected by a second-level application of the KDE procedure to a filesize probability-density distribution of a corresponding subset of the plurality of subsets;

partitioning each subset of the plurality of subsets into a corresponding plurality of pass groups, where files identified by each pass group are selected as functions of the capacity of the I/O buffer and of a subset histogram that characterizes the subset from which the first group is partitioned, and where each group identifies a collection of files that can simultaneously fit into the I/O buffer with minimal unused buffer space; and initiating a multi-pass file-transfer procedure that transfers the fileset to the destination location in a sequential series of passes, where each pass fully transfers all files comprised by one group of the pluralities of pass groups, and where an interruption to the file-transfer procedure during a partially completed pass of the series of passes does not result in loss of any file transferred during a previous pass.

Yet another embodiment of the present invention is a computer program product including a computer-readable storage medium storing computer-readable program code that is compatible with a file-management system, of a computer, that includes a processor, a memory coupled to the processor, and a computer-readable hardware storage device coupled to the processor. The stored program code is configured to be run by the processor via the memory to perform a method for hierarchical file transfer using KDE-optimized filesize probability densities. This method includes:

generating a fileset histogram that approximates a probability-density distribution of filesizes of all files in the fileset, using a non-parametric kernel-density estimation (KDE) procedure to assign of the fileset histogram an identical fileset kernel width;

dividing the fileset into a mutually exclusive plurality of subsets as a function of the fileset histogram and of the total capacity of one or more I/O buffers that will be used by the computer to perform the requested file transfer;

producing a set of subset histograms that each approximate a probability-density distribution of filesizes of all files in a corresponding subset of the plurality of subsets, where every bin of each histogram of the subset histograms has an identical kernel width, specific to that histogram, that is selected by a second-level application of the KDE procedure to a filesize probability-density distribution of a corresponding subset of the plurality of subsets;

partitioning each subset of the plurality of subsets into a corresponding plurality of pass groups, where files identified by each pass group are selected as functions of the capacity of the I/O buffer and of a subset histogram that characterizes the subset from which the first group is partitioned, and where each group identifies a collection of files that can simultaneously fit into the I/O buffer with minimal unused buffer space; and initiating a multi-pass file-transfer procedure that transfers the fileset to the destination location in a sequential series of passes, where each pass fully transfers all files comprised by one group of the pluralities of pass groups, and where an interruption to the file-transfer procedure during a partially completed pass of the series of passes does not result in loss of any file transferred during a previous pass.

DETAILED DESCRIPTION

Figure 1:
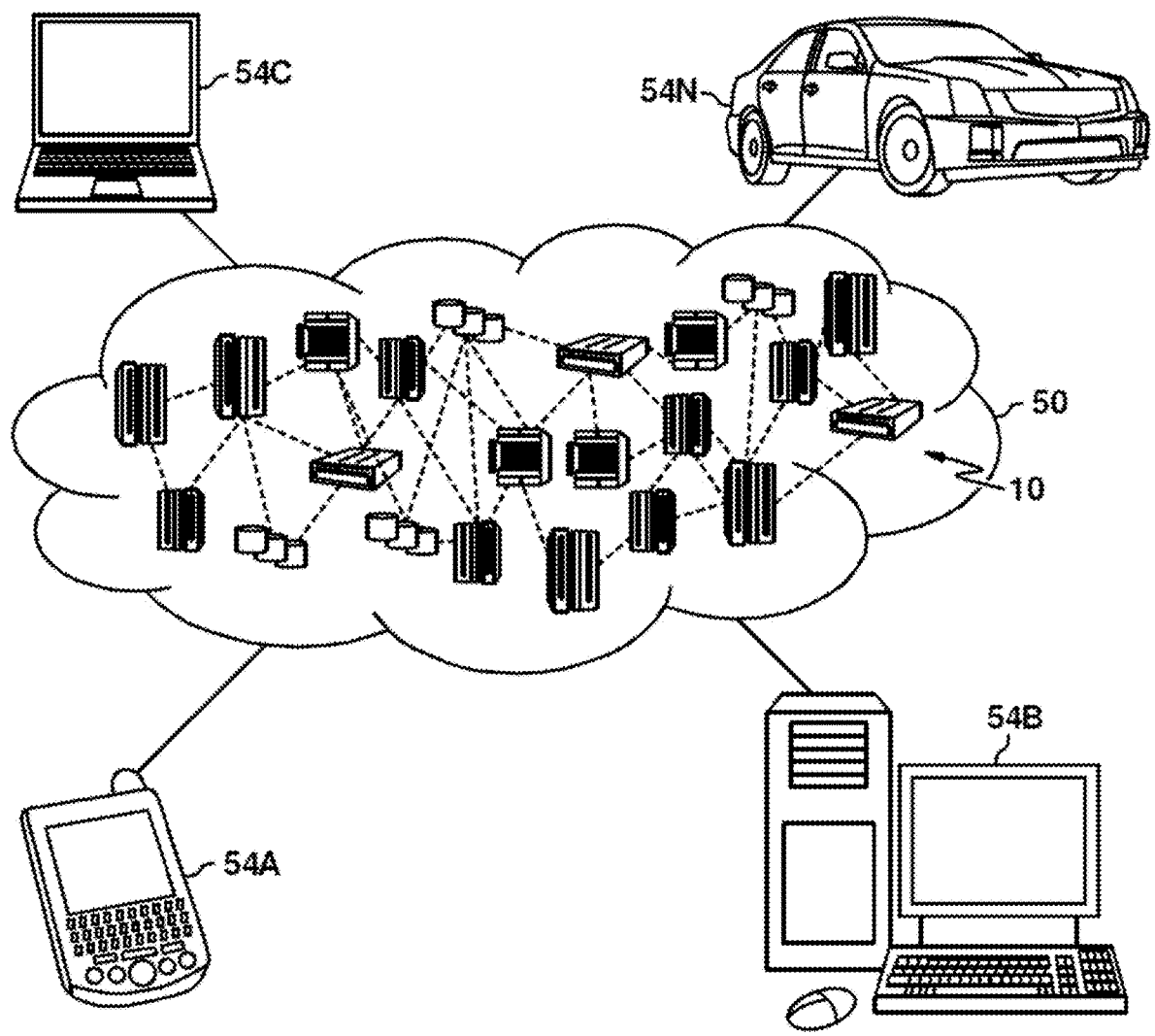
FIG. 1 depicts a cloud computing environment according to an embodiment of the present invention.

Embodiments of the present invention improve known computerized operating-system technology by providing a more efficient, flexible, and robust method of transferring software objects, like files, directories, and databases. These improvements solve technical problems arising from known file-transfer mechanisms of current computer operating systems and applications: the inability to structure and sequence transfers so as to optimize usage of communications bandwidth along the path through which data objects are transferred; and the inability to structure and sequence transfers so as to minimize data loss if the transfer is interrupted.

By improving the operation of file-transfer mechanisms of such systems and applications, embodiments of the present invention improve the operation of computers per se because file-transfer functionality is an essential and nearly ubiquitous feature required by virtually computers and by the overwhelming majority of computerized applications and systems.

Known methods of moving or copying a set of files transfer files one by one or group files into subsets and then transfer the subsets one by one. Either approach raises problems that are not fully addressed by file-transfer technologies of current computer systems.

In general, known technologies do not consider implementation-dependent constraints or user preferences in to optimize the organization of files into subsets or to optimize the sequence in which files or subsets are transferred. There is thus no way to ensure that files are transferred in an order that optimizes performance or reliability for a particular combination of file, user, system, and network characteristics.

For example, there is no way to ensure that files are grouped or ordered in terms of relative importance to a user. If a user wishes to transfer files in a particular order or as a particular sequence of subsets, the user can accomplish this only by manually performing multiple transfers, each of which transfers one file or group of files selected by the user. This constraint becomes even more limiting when source files are organized into a data structure, like a hierarchy of nested folders or a database schema, that must be preserved in the transferred destination files.

Certain file-transfer technologies require multiple passes in order to transfer a set of files, where each pass completely transfers all files in one subset of the fileset. In other cases, one pass may transfer only a portion of certain files in a subset, requiring multiple passes in order to completely transfer certain files.

Therefore, even if a user cancellation or a communications failure interrupts a transfer during a fourth pass through a set of files, a file-transfer system might preserve any files that had been completely transferred during the first three passes. But files that had not been completely transferred during the fourth pass, however, would be lost.

When an interruption (due to either a deliberate user action or to a technical fault) occurs during a multi-pass transfer, some file-transfer technologies are thus capable of terminating gracefully without losing transferred files that had been completely transferred at the conclusion of the most recent fully completed pass. But such systems still do not let users decide which files should be transferred in each pass. This prevents users from specifying that more important files should be transferred in earlier passes, thus increasing the chance that those files are successfully transferred should an interruption occur.

Known technologies attempt to address these issues by autonomously determining file-transfer order, but even these systems do not consider extrinsic factors like user priorities, filesize probability distributions, and characteristics of a transfer mechanism when sequencing files into passes. As a result, they may try to transfer too few or too many files concurrently, failing to optimize use of an I/O interface's cache or buffer. When problems like this occur, it becomes more likely that numerous partially transferred files will be unnecessarily lost when an interruption occurs.

Furthermore, without a means of optimizing transfer order, it is possible that a mission-critical file might not have been completely transferred when an interruption occurs because the system had been consuming excessive bandwidth to transfer less-important files or had assigned the more-important file to a later pass.

These constraints are especially limiting during very large transfers or when a user does not have access to a persistent communications path that is guaranteed to maintain bandwidth for the duration of a transfer. If, for example, a large copy, move, upload, or download requires twelve hours to complete by means of a service of a cloud-computing host or of an Internet Web site, a user may wish to manually define passes or to manually set breakpoints between each pass, in order to ensure that the most important files are completely transferred as soon as possible in case of a loss of connectivity. Known file-transfer technology generally does not permit such activities, and does not possess the ability to intelligently define passes or breakpoints in order to intelligently approximate a file-transfer structure that a user might desire.

Even if this was not the case, known file-transfer mechanisms do not allow users to make productive use of such a feature by interactively or dynamically depicting the relative sizes of files to be transferred, the distribution of filesizes among the files to be transferred, or the relationship between the distribution of filesizes and the size of I/O buffers that would be used during a file transfer. Such a visual representation would allow users to more knowledgeably determine which files should be grouped together or sequenced in a particular way.

Finally, although known file-transfer technologies determine a number of passes through a hierarchy of selected files, such file-transfer technologies do not consider and analyze job-specific context in order to optimize the number of passes for a particular file-transfer job. For example, known file-transfer technologies do not group files in order to minimize wasted space in an I/O buffer and generally organize files based on the amount of storage space consumed by each file on a storage medium. This amount of storage space usually misrepresents the true amount of data contained in each file, which is a better measure of the amount of data that must be transferred during a file-transfer job.

Embodiments of the present invention implement these improvements by transferring files in passes that are structured to make optimal usage of an underlying computer's or network's high-speed I/O buffers. For example, if an I/O buffer can hold 1 MB of transferred data, each pass would transfers an amount of data that approaches, but does not exceed the buffer's 1 MB capacity. In this way, each pass can be completed by transferring one buffer of data, filling the buffer during each pass with as much data as possible. Although each pass might transfer a different amount of data, embodiments strive to optimize the overall file-transfer job by minimizing the total amount of unused buffer space wasted during all passes.

This solution solves performance and resource-consumption problems inherent in known file-transfer technologies of today's operating systems because transferring data from a high-speed buffer is much faster and more efficient than transferring files directly to or from secondary storage, such as a hard drive. If an I/O buffer can be preloaded with data (or "prefetched") from a hard drive while other file-transfer tasks are being performed, the prefetched data can subsequently be transferred from the buffer in much less time than it could have been transferred directly from the hard drive. Buffered file transfers can thus theoretically run faster than unbuffered transfers, and embodiments of the present invention further improve performance by ensuring that the buffer is always as close to being as completely filled as possible. By reducing the amount of wasted buffer space, embodiments thus reduce the total number of passes and transfer steps required to complete a file-transfer job.

Embodiments further improve known file-transfer technologies by more accurately determining the amount of data that must be transferred when transferring a file. The amount of true data contained in a computer file is generally less than the amount of storage space required to store the file. This occurs because secondary storage mechanisms, like hard drives or solid-state storage devices, store data in discrete blocks. So storing the data contained in a file generally consumes unused space in at least one such block. Known file-transfer technologies of current computerized operating systems generally determine a file's filesize to be equal to the amount of storage required to store the file on a secondary storage device. Embodiments of the present invention, on the other hand, make an operating-system call to identify the true size of the data contained in a file, and use this true size to better determine the amount of data that must be moved in order to transfer the file. This improvement results in more accurate predictions of the amount of I/O buffer space that must be allotted to the file during a transfer.

Embodiments of the present invention also improve known file-transfer technologies' file-management and transfer-sequencing mechanisms when transferring a fileset that has a hierarchical internal structure, such as a directory tree, disk partition, relational database, or other type of data structure. While current operating systems traverse a hierarchical structure along a predetermined path, such as by a simple left-to-right, level-by-level traversal, the present invention attempts to identify a most efficient traversal mechanism by comparing results of alternative traversal paths. Embodiments also improve on known traversal methods by using KDE-optimized histograms to model filesize probability-distribution curves at various levels in a hierarchy in order to determine a most efficient traversal path.

Finally, certain embodiments of the present invention allow a user to set priorities for some or all files of a transfer, such that the embodiment attempts to transfer higher-priority files during earlier passes. Because each pass fully transfers complete files (unless a file exceeds the size of an I/O buffer), rather than partially transferring files that will be completed in later passes, it is more likely that a more important file will have been completely transferred before a mid-transfer interruption occurs.

For all these reasons, embodiments of the present invention comprise improvements to computer systems in general and in particular to any computerized operating system or application capable of transferring stored files from a source storage location to a destination storage location.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
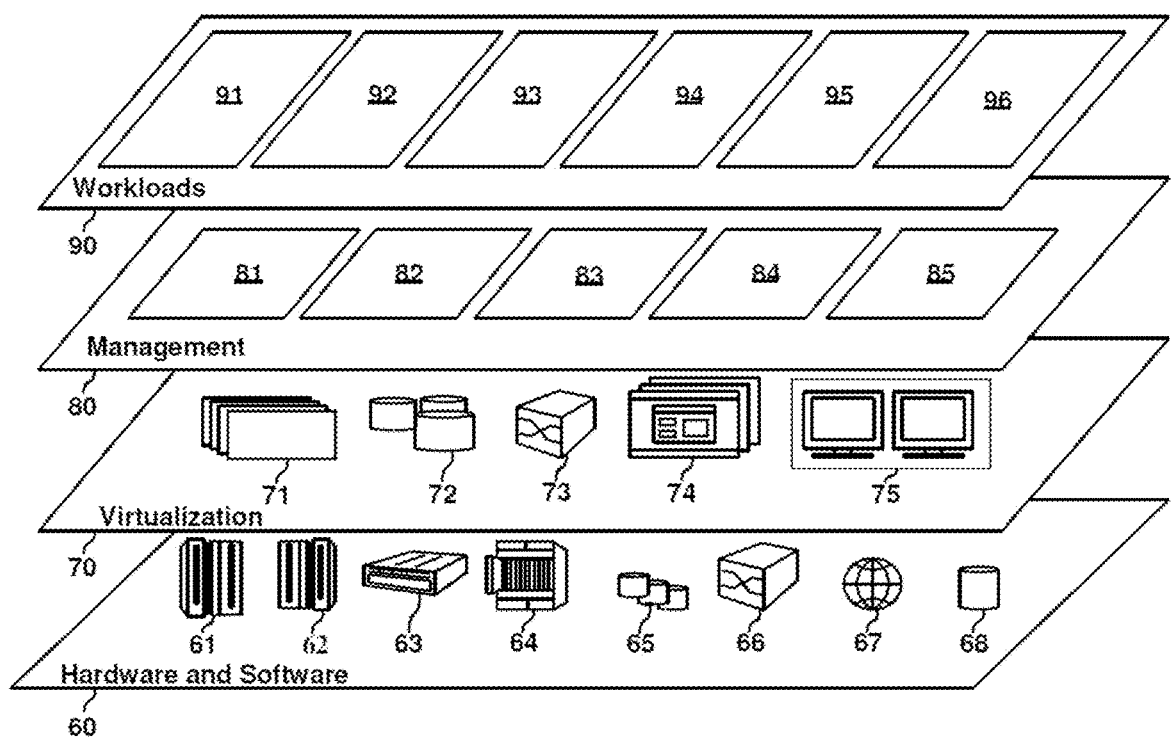
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex hierarchical file transfers using KDE-optimized filesize probability densities.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
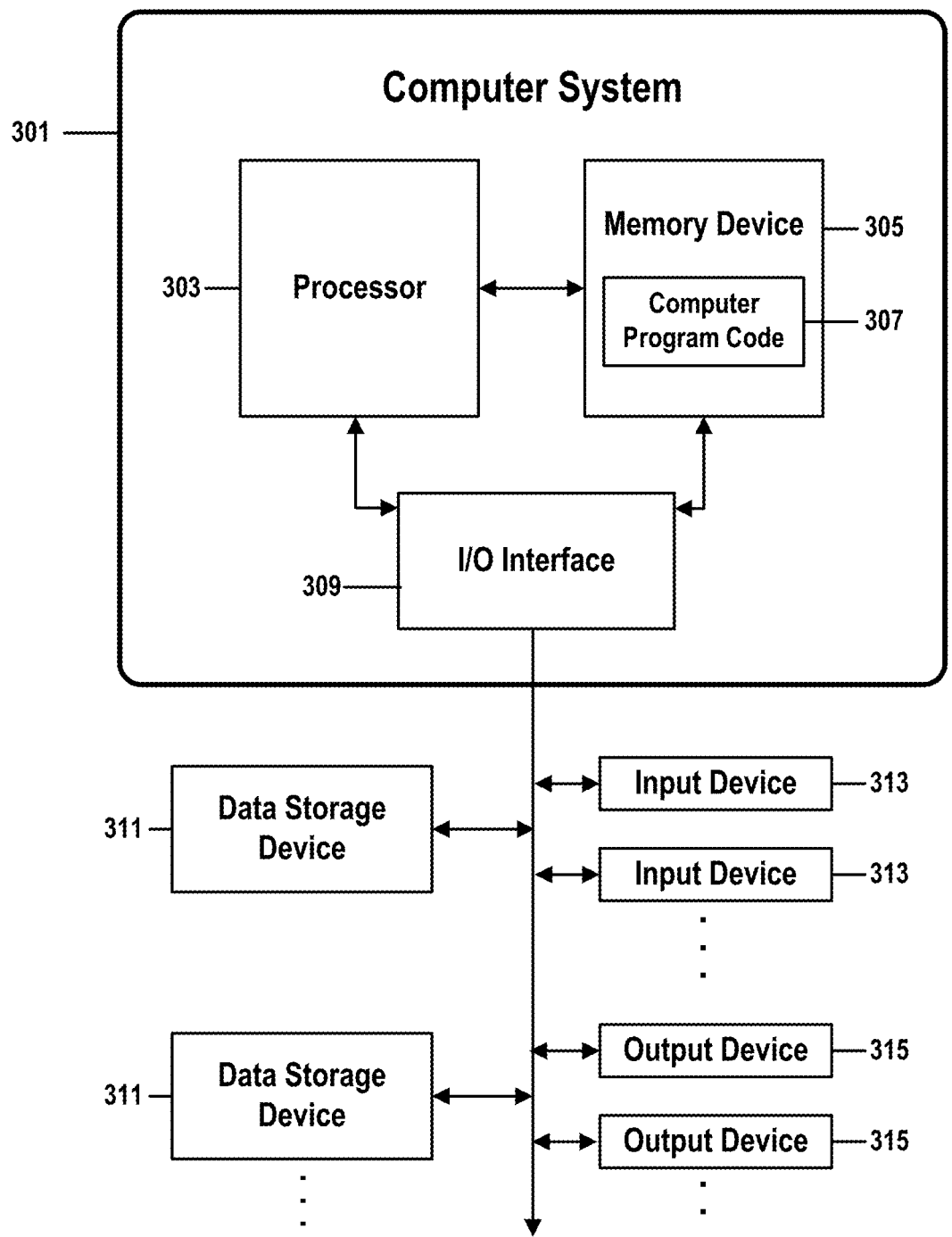
FIG. 3 shows the structure of a computer system and computer program code that may be used to implement a method for hierarchical file transfer using KDE-optimized filesize probability densities in accordance with embodiments of the present invention.

FIG. 3 shows a structure of a computer system and computer program code that may be used to implement a method for hierarchical file transfer using KDE-optimized filesize probability densities in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for hierarchical file transfer using KDE-optimized filesize probability densities in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for hierarchical file transfer using KDE-optimized filesize probability densities.

Any of the components of the present invention could be created, integrated, hosted, maintained, deployed, managed, serviced, supported, etc. by a service provider who offers to facilitate a method for hierarchical file transfer using KDE-optimized filesize probability densities. Thus the present invention discloses a process for deploying or integrating computing infrastructure, comprising integrating computer-readable code into the computer system 301, wherein the code in combination with the computer system 301 is capable of performing a method for hierarchical file transfer using KDE-optimized filesize probability densities.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for hierarchical file transfer using KDE-optimized filesize probability densities may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for hierarchical file transfer using KDE-optimized filesize probability densities is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4A:
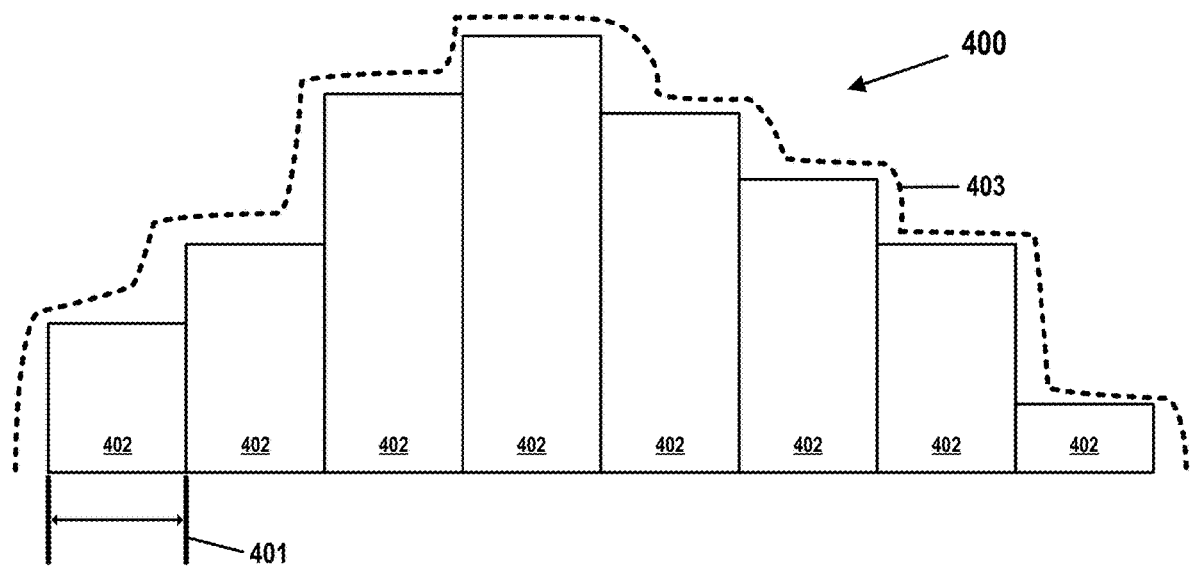
FIG. 4A represents the process of fitting a curve representing a probability-density function to a histogram generated by a window function comprising a larger kernel width.
Figure 4B:
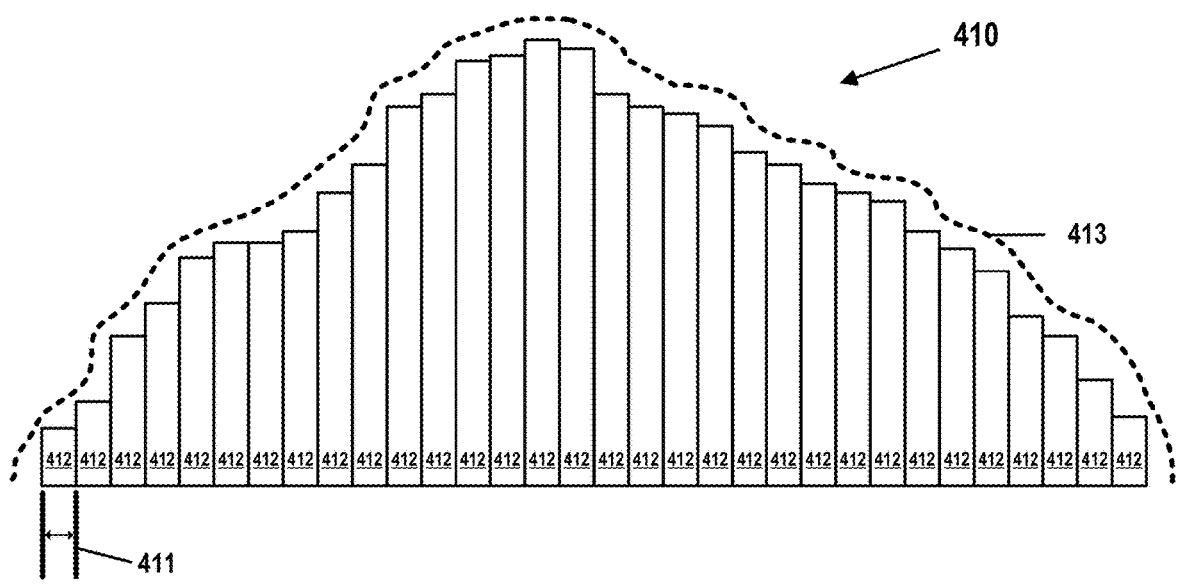
FIG. 4B shows how a smaller kernel width allows a more accurate fitting of a curve to a histogram generated by a window function.

FIGS. 4A and 4B compare the effect of changing the kernel width of a window function (also known as an apodizing or tapering function) when curve-fitting a probability-density function to a histogram. In embodiments of the present invention, such a histogram is used to model a univariate probability distribution of filesizes of a set of files.

FIG. 4A represents the process of fitting a curve representing a probability-density function to a histogram generated by a window function comprising a larger kernel width. FIG. 4A shows items 400-403.

In this example, a histogram 400 is represented as a vertical bar chart 402. The horizontal axis of the histogram 400 represents a set of values of a variable, such as a set of filesizes of a set of files. The height of each rectangular bar 402 represents the number of occurrences of values that fall within a range corresponding to the horizontal range of that bar 402.

In the example of FIG. 4A, every rectangle has an identical width 401. Here, each rectangular bar of histogram 400 is generated by known means by applying a window function to the population of values of F. The kernel width 401 of this window function is 4 MB, yielding the eight sample ranges 402 that span values of F between 4 MB and 36 MB. Although elements of this procedure are known in the art, embodiments of the present invention employ a novel KDE (kernel density estimation) function to select an optimal kernel width 401.

In one example, the histogram represents the distribution of a set of filesizes F ranging from 4 MB to 36 MB. Each rectangle has a width 401 that corresponds to a 4 MB range. The height of the leftmost rectangle 402, for example, represents the number of files in the fileset that have filesizes within the range of 4 MB to 8 MB; the height of the next rectangle, proceeding left to right, represents the number of files in the fileset that have filesizes in the range of 8 MB to 12 MB; and so forth. The fact that the fourth rectangle 402 has the greatest height indicates that more files of the fileset fall into the range of 16 MB-20 MB than into any other 4 MB range.

Taken as a whole, the eight rectangular bars of histogram 400 represent the distribution of values of variable F for files within the fileset. A function that mathematically describes the probability distribution p(F) represented by histogram 400 may be represented as a curve, and this curve may be approximated through known means of curve-fitting a probability curve 403 to the histogram. As can be seen in FIG. 4A, it is relatively difficult to derive a smooth probability function by curve-fitting to a histogram that comprises only eight ranges.

FIG. 4B shows how a smaller kernel width allows a more accurate fitting of a curve to a histogram generated by a window function. FIG. 4B shows items 410-413.

In a manner analogous to that of entities shown in FIG. 4A, histogram 410 of FIG. 4B is composed of rectangular bars that in aggregate span a horizontal range of values F between 4 MB and 36 MB. Here, however, this range is divided into thirty-two horizontal ranges, each of which spans a 1 MB range 411. Each rectangle has been defined and limited to the 1 MB horizontal width by a window function that identifies a kernel width of 1 MB.

In embodiments of the present invention, increased granularity of histogram 410 would allow the curve representing the probability density of filesizes to be fit more smoothly to a histogram 410. FIGS. 4A and 4B thus illustrate how a smaller kernel width of a window function used to partition a univariate data set can generate a more accurate probability density function of the data set. As the width of the kernel approaches zero, the curve-fitting procedure produces an increasingly perfect fit.

This improved fit does not, however, come without cost. Decreasing the kernel width 411 and increasing the density of rectangles 412 increases computational complexity and resource consumption, such that using a window function with too small a kernel width can make a curve-fitting procedure prohibitively resource-intensive.

This problem has been addressed by known methods of kernel density estimation (KDE), which strive to select an optimal kernel width capable of effecting a satisfactory compromise between computational efficiency and modeling accuracy. Embodiments of the present invention generate histograms by known means that comprise window functions with kernel widths selected by such KDE procedures. The resulting histograms allow subsequent steps of the present invention, as illustrated in FIG. 5, to more effectively group files, as a function of each file's filesize, in order to perform a more efficient file transfer.

Figure 5:
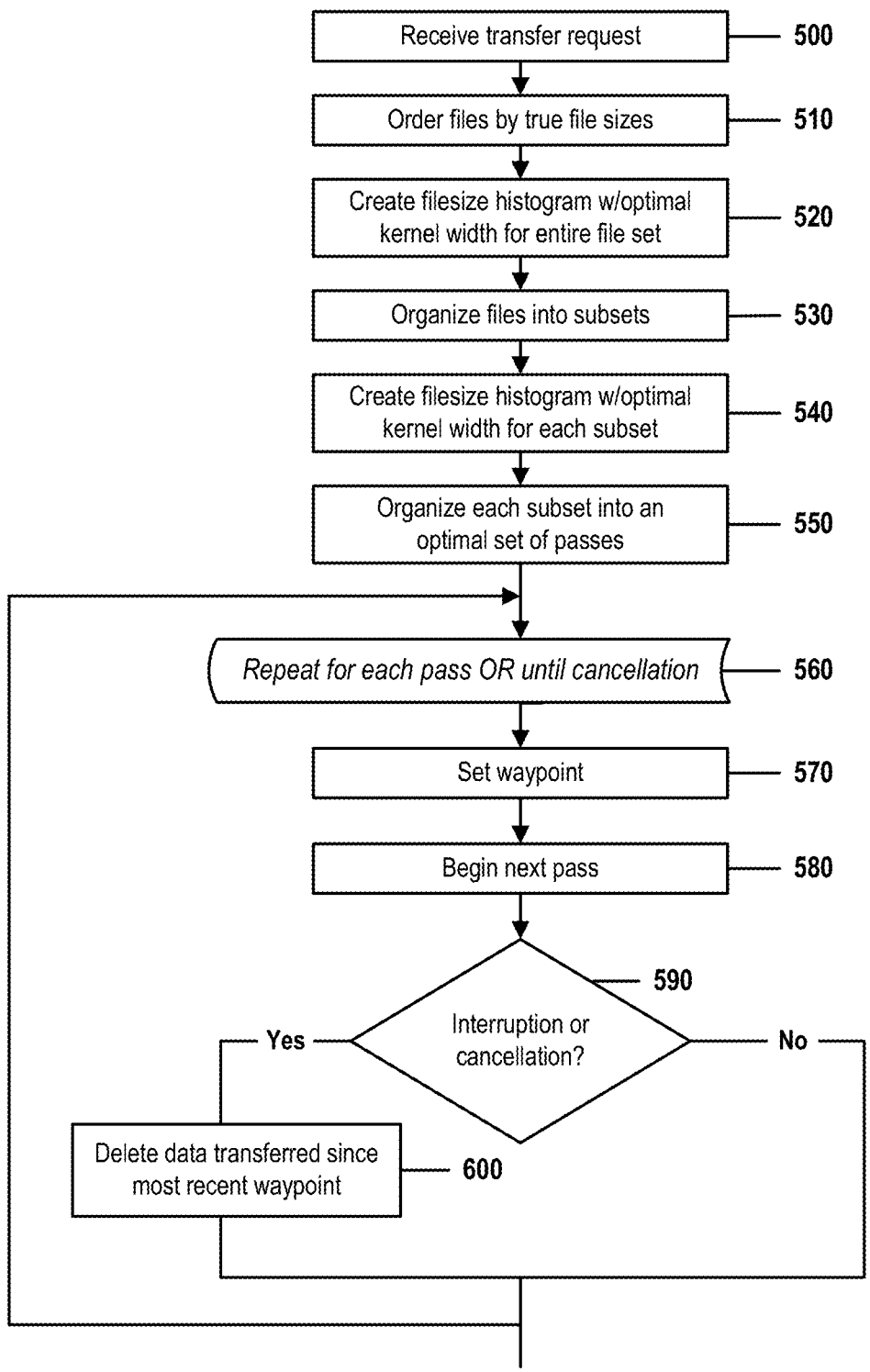
FIG. 5 is a flow chart that illustrates steps of a method for hierarchical file transfer using KDE-optimized filesize probability densities in accordance with embodiments of the present invention.

FIG. 5 is a flow chart that illustrates the steps of a method for hierarchical file transfer using KDE-optimized filesize probability densities in accordance with embodiments of the present invention. FIG. 5 contains steps 500-600.

In step 500, a processor receives notice that a user has requested the transfer of a set of files from a source location to a destination location. The processor runs a file-management component of an operating system or other host operating environment of a physical or virtualized computerized system or network. The notice is received by any means known in the art, such as through a network interface, through a user interface managed by the operating system or other host operating environment, or through an internal hardware or software communications mechanism supported by the operating system or other host operating environment.

The notice comprises at least an enumeration of the files to be transferred, the current location of each file, and destinations to which each file is to be transferred. The transfer may comprise a copy operation, a move operation, the creation of hyped inks or shortcuts, or other known procedures capable of transferring data to a destination location.

The source and destination locations may be any computerized, non-transitory storage locations known in the art, such as a rotating-media or solid-state storage medium, a disk drive, or computer RAM. The "file" data items to be transferred may also take any form known in the art, such as stored data files, folders, fields of a database, or rows of a flat file. The files may be organized into any structure known in the art, such as a hierarchical directory tree, a schema of a database, or other types of data structure.

In step 510, the processor enumerates filesize characteristics of each file to be transferred, including the true size of each file. Here, the term "true size" identifies the amount of data stored in the file and the amount of data that must be stored in an I/O buffer when that file is transferred. The term does not necessarily refer to the amount of storage space allocated to the file by a file-management component of the file's source or destination storage medium, operating system, or other host operating environment.

For example, if a file system stores data in indivisible 4 KB disk clusters, a file that contains 10 KB of real data would require 12 KB (three 4 KB clusters) of disk clusters to store on disk. But transferring the file would require the transfer of only the file's "true" 10 KB of data.

Conversely, a file system that automatically compresses a file's white space when storing the file on disk might require only 2.4 MB of compressed disk space to save a 10 MB word-processing file in. In this latter example, although the file fits into only 2.4 MB of compressed secondary storage, copying the file to a different location might still require transferring 10 MB of uncompressed data.

Some operating systems use a distinct procedure to compress data during I/O operations in order to conserve bandwidth. Such a system might, for example, load a 5 MB file into the system's I/O buffer as 3 MB of compressed data. In such a case, an embodiment of the present invention might consider that file's "true size" to be the 3 MB of data that is actually transferred during the copy procedure.

In step 520, the system uses known computational methods to represent the distribution of filesizes of the fileset as a histogram. This histogram may take any form known in the art, including that of a vertical bar graph, as depicted by items 400 and 410 in FIGS. 4A and 4B. The horizontal axis of the histogram generated in step 520 is calibrated in units of filesize (such as kilobytes, megabytes, or other units based on quantities of data contained in a file) and the vertical axis represents the total number of files of the fileset that share a filesize identified by a corresponding horizontal-axis value.

The histogram is derived from the filesize listing of step 510 by known statistical means that may comprise, for example, use of a window function (sometimes called an apodization function or tapering function) that sets the number, width 411, and height of the rectangular bars 412 comprised by the histogram. In particular, the window function selects a kernel width 401 or 411 that defines the horizontal width of each rectangular bar 412 of the histogram, corresponding to the range of filesizes comprised by each rectangular bar 412.

Optimal kernel width for the probability distribution of the entire fileset may be estimated by any known method, such as through a non-parametric KDE (kernel density estimation) methodology, or by the Parzen-Rosenblatt window method. In one example, the system would begin such a procedure with an initial approximation of a kernel width that corresponds to a simple Gaussian distribution, and would then solve for an optimal fit using Silverman's rules of thumb for bandwidth selection. In other cases, however, KDE would be especially appropriate in real-world embodiments that comprise a random or other type of non-parametric distribution of filesizes because KDE is known in the art to excel at providing a non-parametric estimate of a probability density function of a random variable.

KDE attempts to select a uniform kernel width 411 for each vertical bar 412, in order to smoothly fit a curve representing a probability-function curve to the histogram, by selecting: i) an optimal width 411 of each rectangular range 412 (sometimes referred to as a kernel or bin); and ii) an optimal number of such ranges 412 required to represent all filesizes of the fileset. KDE procedures may select these parameters as a compromise between the goal of fitting the smoothest, most precise curve to the histogram and the computational complexity of the curve-fitting operation, which increases rapidly with the number of ranges 412.

This step may be considered optional in some embodiments, but in other embodiments, this top-level kernel-width estimation is a mandatory step for reducing the computational complexity of step 530 and subsequent steps of the method of FIG. 5.

In step 530, the system organizes the hierarchical fileset into a group of subsets. For example, if the fileset comprises three levels of file directories, the system might in this step create a first subset of 800 files in a first level (a Root Folder), a second subset of the 5500 files in a second level (Folders 01, 02, and 03, which would be direct children of the root folder), and a third subset of the 200 files in a third level (Folders 02-1 and 02-2, which would be direct children of Folder 02). In this example, the Root folder would store 800 files, Folders 01 and 02 would each store 2500 files, Folder 03 would store 500 files, and Folders 02-1 and 02-2 would each store 100 files.

Embodiments of the present invention are not limited to selecting subsets that each consist of all files of a particular horizontal level, a vertical level, or a branch of a hierarchical tree. Embodiments of the present invention are flexible enough to accommodate any method or guidelines, as desired by an implementer, for dividing a fileset into subsets.

In certain embodiments, additional or different criteria may thus be used to determine which files are represented by each histogram. For example, if an implementation is known to comprise a 100 MB I/O buffer, each subset may be selected by traversing a hierarchy left to right, one level at a time, but limiting the total amount of data in each subset/histogram to a total true filesize of 10 GB. Therefore, each level might be organized into more than one subset, each level may correspond to a different number of subsets, or a single subset may be broken between two levels.

Similarly, if it is known that the files in a hierarchy are likely to have filesizes within an order of magnitude of 1 MB and that an I/O buffer has a storage capacity of 100 MB, subsets may be generated by traversing a hierarchy left to right, one level at a time, where each subset is limited to no more than 2,000 files per subset. In this latter example, the hierarchy described in par. [0120] would be divided into:

Subset 1: Root folder+2200 files of Folder 01;
Subset 2: 300 files of Folder 01+1700 files of Folder 02; and Subset 3: 800 files of Folder 02+Folders 03, 02-1, and 02-2

Some embodiments may comprise conditional rules that determine how files are organized as a function of user specifications received at the time that a file transfer is initially requested, such as a user designation that certain files or folders having a certain priority, or a user specification that certain file types or certain folders should be transferred before others, whenever possible.

In step 540, the system generates a filesize probability distribution histogram for each subset selected in step 530. As in step 520, the system employs known methods of kernel density estimation (KDE) to derive an optimal kernel width 411 and an optimal number of kernels (or bins) for each of these histograms. The non-parametric KDE method may be used in this step to select a kernel width because the potentially irregular distribution of filesize data of a subset is not guaranteed to fit a standard distribution, such as a Gaussian distribution, preventing the system from using a standard parametric distribution function.

Because these histogram-generation procedures can be resource intensive, the system may reduce the complexity of step 530 by starting each of these kernel-width estimations with the first-order kernel-width estimate of the entire fileset that was derived in step 520. More importantly, starting these second-order histogram computations with the first-order estimates is an improvement that provides the second-level histograms with more accurate results, and does so with a more efficient use of resources. This improvement occurs because such a two-phase KDE procedure allows the second set of kernel-width estimates to be more simply determined as a mere set of deviations from the top-level distribution. This feature can, in some implementations, provide great improvements in accuracy and speed.

At the conclusion of step 540, the system will have generated a lower-level set of histograms, each of which represents a probability distribution of true filesizes of a subset of the fileset to be transferred. The histograms may have different kernel widths, but, as in FIG. 3, all kernels of any single histogram will have the same width. In some embodiments, each histogram's kernel width will have been generated by means of a KDE procedure.

In step 550, the system divides each subset of files identified in step 520 into a set of one or more passes. Each set of passes will correspond to the transfer of all files contained in one of the subsets.

The files in a subset will be divided among a corresponding set of passes as a function of the size of one or more I/O buffers comprised by a file-transfer mechanism. For example, if the computer system performing the requested file-transfer job transfers data files through an I/O mechanism that comprises one or more 1 MB I/O buffers (or that comprises a set of buffers that in aggregate can hold a total of 1 MB of data), certain embodiments would select a combination of files (from all files of a subset that have not already been transferred), such that the current pass transfers the most data that that can fit into the 1 MB buffer. In more sophisticated embodiments, the system may select multiple groups concurrently so as to minimize, in aggregate, the total amount of unused I/O buffer space for all passes or for all subsets.

Certain embodiments may permit a file to be divided between two passes. This may happen when the true size of the file is greater than the maximum amount of data that may be stored in the buffer. This may also happen when certain conditions allow a file to be partially transferred during a single pass, such as when a file is assigned a lower priority or when splitting the file results in other efficiencies. In general, however, a goal of the present invention is to minimize or eliminate partial file transfers that may cause loss of data if a transfer job is interrupted midstream.

Files of a subset are divided into passes as functions of the subset's histogram, generated in step 540, and of the storage capacity of the I/O buffer or buffers through which the files will be transferred. In some embodiments, these divisions may also be performed as a function of user-designated conditions, such as the assignment of priorities to certain files or folders.

Methods of performing these divisions are known in the art, such as statistical minimization or combinatorial computations that select combinations of files in a subset, as a function of the filesize distributions identified by a histogram, such that the files fit into the smallest number of buffers. In simpler implementations, an operating system might simply select files from a subset by using the histogram. For example, if the system has a 1 MB buffer, and a histogram indicates that a subset contains 10,000 1 KB files, the system might initially configure the first ten passes to each contain 1,000 1 KB files and then systematically proceed through other ranges of the histogram to select files for subsequent passes. In slightly more sophisticated embodiments, the system might begin this process with histogram ranges that correspond to the largest filesizes, or to histogram filesize ranges that comprise the greatest numbers of files. In other cases, files may be sorted and organized so as to optimize the transfer of peak and tail histogram filesize ranges (the ranges that contain the lowest numbers of files), or may be organized such that each pass contains filesizes that are shown by a histogram to have filesizes lying within one or two standard deviations of each other, or of a subset's median or mean filesize.

In some embodiments, each subset is transferred in the order in which it was generated during the hierarchy traversal of step 530. In such cases, this allows the hierarchy to be more systematically reproduced at the destination site, one folder at a time or one level at a time.

In all cases, the goal of this step is to identify an optimal or near-optimal division of a subset of files into distinct passes that minimize the amount of wasted space in the I/O buffer, minimize the total number of passes, minimize the amount of CPU context-switching required to perform the file-transfer job, minimize the amount of secondary storage I/O required to perform the file-transfer job, or otherwise make the most efficient use of the computer system's file-transfer resources. These improvements are made possible by steps of the method of FIG. 5 that sort a file set into subsets and passes as a function of true filesize and of I/O buffer capacity, and that use a two-phase KDE operation to ensure that the sorting criteria are accurately modeled, even when a file-transfer job comprises an enormous number of files.

At the conclusion of step 550, the processor or computer system will have organized the fileset to be transferred into a sequence of passes, where each pass designates a group of files that together have a total true filesize as close as possible, but not exceeding, the maximum amount of data that can be stored in the file-transfer system's hardware or software I/O buffer.

Some embodiments may provide additional functionality before, during, or after this step that visually displays characteristics of the transfer or allows users to fine-tune characteristics of the transfer. An embodiment may present to users one or more histograms or other visual, graphical, textual, or animated representations of all or part of the file-transfer job. This data visualization may identify information like: a graphical representation of the files in the entire job or in a pass optionally organized into a data structure that represents the organization of the files; the distribution of filesizes in the entire job, in one or more levels of the data structure, or in one or more passes; a comparison of the amount of storage consumed by a file to the true size of the file; a listing of waypoints that shows relationships among waypoints, passes, and the files contained in each pass; a relationship between the true sizes of one or more files and the capacity of the I/O buffer; a time scale that estimates the duration of time that will be required to transfer a file or a component of the data structure, to complete a pass, or to perform the entire file-transfer job; and any other characteristic of the file-transfer job that an implementer might deem relevant.

Similar visualizations may also be displayed during the iterative procedure of steps 560-600, after the transfer has begun, in order to display the current state of the file-transfer job or of the current pass. This current state may represented as a function of: an organization of files that have been fully transferred, have not yet begun transfer, or are currently being transferred; fluctuations in the available bandwidth of a network or other file-transfer hardware or software used in the transfer; the current utilization of each I/O buffer used in the transfer; the current availability of other system resources used in the transfer; and other visual, continuously changing, characteristics of the file-transfer job.

In some cases, this visualization will let users respond to the display by interactively adjusting parameters or characteristics of the file-transfer job interactively in order to fine-tune the transfer job to better meet the user's objectives. This fine-tuning may comprise, but is not limited to, operations like: shifting files between passes; pausing, restarting, or canceling a partially completed transfer in progress; removing certain files or components of the data structure from the job; adding files, folders, or other data elements to the job; setting a transfer priority of a file; or requesting that the system repeat earlier steps of the method of FIG. 5 in order to reorganize files into a new set of passes based on the current status of the job or on user-specified conditions or revisions.

Step 560 begins the iterative procedure of steps 560-600, which is performed once for each pass generated in step 550, or until the method of FIG. 5 is canceled or interrupted before all files have been transferred.

In step 570, the processor sets a waypoint to mark the beginning of the current pass. This waypoint marks a point in the overall file-transfer job at which none of the files in the current pass have begun transfer and at which all files in previous passes have been transferred in full.

In step 580, the processor begins transferring the files in the current pass. As described above, this group of files should fit in their entirety into the one or more I/O buffers used by the system or platform to perform file transfers. In some systems the files will have been previously loaded (or "prefetched") into the buffer, such that the system may transmit all files comprised by the pass from the buffer to their destination in one high-speed I/O operation.

The processor continues transferring the files comprised by current pass unless it receives a hardware, network, or software failure, or a user-based cancellation, interrupts the transfer before completion.

In step 590, the system determines whether the current pass has been interrupted before completion. If the system detects an interruption, the method of FIG. 5 continues with step 600. Otherwise, the current iteration of the iterative procedure of steps 550-600 completes and, if any more passes remain, another iteration is begun in order to transfer files comprised by the next pass.

In step 600, if the processor has detected that the current pass has been interrupted, the system, in certain embodiments, deletes, from the destination location, any partially transferred segments of files transferred since the waypoint most recently set in step 570. Files that had been transferred prior to that waypoint, in previous passes, will have been fully transferred and will remain available at the destination location.

In other embodiments, the interruption detected in step 590 may not cancel the file-transfer job, instead merely pausing or suspending the job until a condition that created the interruption is resolved, or until a user-designated suspension detected in step 590 is terminated. In such cases, the system may either: i) resume the current pass, transferring remaining portions of any partially transferred files to the destination location, where the partially transferred file segments still reside; or ii) restart the current pass from the waypoint most recently set in step 570, after deleting any partially transferred file segments from the destination location.

At the conclusion of step 600, if the current, interrupted, pass has not been restarted, the current iteration of the iterative procedure of steps 550-600 ends and the method of FIG. 5 completes without further file-transfer activity.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A file-management system of a computer, comprising a processor, a memory coupled to the processor, and a computer-readable hardware storage device coupled to the processor, the storage device containing program code configured to be run by the processor via the memory to implement a method for hierarchical file transfer using KDE-optimized filesize probability densities, the method comprising:

the system receiving a request to transfer a fileset from a source location to a destination location;

the system generating a fileset histogram that approximates a probability-density distribution of filesizes of all files in the fileset, where every bin of the fileset histogram has an identical fileset kernel width selected by a first-level application of a non-parametric kernel-density estimation (KDE) procedure to a probability-density distribution of filesizes of all files comprised by the fileset;

the system dividing the fileset into a mutually exclusive plurality of subsets as a function of the fileset histogram and of a capacity of an I/O buffer that will be used by the computer to perform the requested file transfer;

the system producing a set of subset histograms that each approximate a probability-density distribution of filesizes of all files comprised by a corresponding subset of the plurality of subsets,
  where every bin of a first histogram of the subset histograms has an identical kernel width, specific to the first histogram, that is selected by a second-level application of the KDE procedure to a filesize probability-density distribution of a first corresponding subset of the plurality of subsets;
the system partitioning each subset of the plurality of subsets into a corresponding plurality of pass groups,
  where files identified by a first group of the pluralities of pass groups are selected as a function of the capacity of the I/O buffer and as a further function of a histogram of the set of subset histograms that characterizes a subset from which the first group is partitioned, and
  where each group of the pluralities of pass groups identifies a collection of files that can simultaneously fit into the I/O buffer with minimal unused buffer space; and
the system initiating a multi-pass file-transfer procedure that transfers the fileset to the destination location in a sequential series of passes,
  where each pass of the series of passes is configured to fully transfer all files comprised by one group of the pluralities of pass groups, and
  where an interruption to the file-transfer procedure during a partially completed pass of the series of passes does not result in loss of any file transferred during a previous pass.

2. The system of claim 1, where each performance of the second application of the KDE procedure is seeded with an initial kernel width equal to the fileset kernel width.

3. The system of claim 1, where the passes are performed in an order that is determined as a function of a user-specified directive.

4. The system of claim 1, where the system responds to the interruption with an action selected from the group consisting of:
  deleting, from the destination location, partially transferred files created during the partially completed pass,
  allowing partially transferred files transferred during the partially completed pass to remain at the destination location, and
  pausing the file-transfer procedure in a manner that allows the procedure to be resumed at a later time, starting with the partially completed pass.

5. The system of claim 1,
  where the multi-pass file-transfer procedure, if fully completed, duplicates each the in the fileset at the destination location, and
  where the duplicated files are organized into a data structure that is identical to a data structure into which the files in the fileset are currently organized at the source location.

6. The system of claim 1,
  where the multi-pass file-transfer procedure, if fully completed, creates a copy of each file in the fileset at the destination location and deletes each original copy of a file in the fileset from the original source location, and
  where the created copies are organized into a data structure that is identical to a data structure into which the original copies had been organized at the source location.

7. The system of claim 1, where a filesize of any file of the fileset identifies an amount of I/O buffer capacity that is required to store the any file in the I/O buffer.

8. The system of claim 1, there the first application of the KDE procedure is seeded with an initial kernel width of a Gaussian distribution.

9. The system of claim 1, further comprising:
  the system, during each pass of the multi-pass transfer, transferring a distinct group of the pluralities of pass groups by loading all files of the distinct group into the I/O buffer and then directing an operating system of the computer to transfer all contents of the I/O buffer to the destination location.

10. A method for hierarchical file transfer using KDE-optimized filesize probability densities, the method comprising:
  receiving, by a file-management system of a computer, a request to transfer a fileset from a source location to a destination location;
  generating, by the file-management system, a fileset histogram that approximates a probability-density distribution of filesizes of all files in the fileset,
    where every bin of the fileset histogram has an identical fileset kernel width selected by a first-level application of a non-parametric kernel-density estimation (KDE) procedure to a probability-density distribution of filesizes of all files comprised by the fileset;
  dividing the fileset, by the file-management system, into a mutually exclusive plurality of subsets as a function of the fileset histogram and of a capacity of an I/O buffer that will be used by the computer to perform the requested file transfer;
  producing, by the file-management system, a set of subset histograms that each approximate a probability-density distribution of filesizes of all files comprised by a corresponding subset of the plurality of subsets,
    where every bin of a first histogram of the subset histograms has an identical kernel width, specific to the first histogram, that is selected by a second-level application of the KDE procedure to a filesize probability-density distribution of a first corresponding subset of the plurality of subsets;
  partitioning, by the file-management system, each subset of the plurality of subsets into a corresponding plurality of pass groups,
    where files identified by a first group of the pluralities of pass groups are selected as a function of the capacity of the I/O buffer and as a further function of a histogram of the set of subset histograms that characterizes a subset from which the first group is partitioned, and
    where each group of the pluralities of pass groups identifies a collection of files that can simultaneously fit into the I/O buffer with minimal unused buffer space; and
  initiating, by the file-management system, a multi-pass file-transfer procedure that transfers the fileset to the destination location in a sequential series of passes,
    where each pass of the series of passes is configured to fully transfer all files comprised by one group of the pluralities of pass groups, and
    where an interruption to the file-transfer procedure during a partially completed pass of the series of passes does not result in loss of any file transferred during a previous pass.

11. The method of claim 10, where each performance of the second application of the KDE procedure is seeded with an initial kernel width equal to the fileset kernel width.

12. The method of claim 10, where the passes are performed in an order that is determined as a function of a user-specified directive.

13. The method of claim 10, where the system responds to the interruption with an action selected from the group consisting of:
- deleting, from the destination location, partially transferred files created during the partially completed pass,
- allowing partially transferred files transferred during the partially completed pass to remain at the destination location, and
- pausing the file-transfer procedure in a manner that allows the procedure to be resumed at a later time, starting with the partially completed pass.

14. The method of claim 10, where a filesize of any the of the fileset identifies an amount of I/O buffer capacity that is required to store the any file in the I/O buffer.

15. The method of claim 10, further comprising providing at least one support service for at least one of creating, integrating, hosting, maintaining, and deploying computer-readable program code in the computer system, wherein the computer-readable program code in combination with the computer system is configured to implement the receiving, the generating, the dividing, the producing, the partitioning, and the initiating.

16. A computer program product, comprising a computer-readable hardware storage device having a computer-readable program code stored therein, the program code configured to be executed by a file-management system, of a computer, comprising a processor, a memory coupled to the processor, and a computer-readable hardware storage device coupled to the processor, the storage device containing program code configured to be run by the processor via the memory to implement a method for hierarchical file transfer using KDE-optimized filesize probability densities, the method comprising:
- the system receiving a request to transfer a fileset from a source location to a destination location;
- the system generating a fileset histogram that approximates a probability-density distribution of filesizes of all files in the fileset,
  - where every bin of the fileset histogram has an identical fileset kernel width selected by a first-level application of a non-parametric kernel-density estimation (KDE) procedure to a probability-density distribution of filesizes of all files comprised by the fileset;
- the system dividing the fileset into a mutually exclusive plurality of subsets as a function of the fileset histogram and of a capacity of an I/O buffer that will be used by the computer to perform the requested file transfer;
- the system producing a set of subset histograms that each approximate a probability-density distribution of filesizes of all files comprised by a corresponding subset of the plurality of subsets,
  - where every bin of a first histogram of the subset histograms has an identical kernel width, specific to the first histogram, that is selected by a second-level application of the KDE procedure to a filesize probability-density distribution of a first corresponding subset of the plurality of subsets;
- the system partitioning each subset of the plurality of subsets into a corresponding plurality of pass groups,
  - where files identified by a first group of the pluralities of pass groups are selected as a function of the capacity of the I/O buffer and as a further function of a histogram of the set of subset histograms that characterizes a subset from which the first group is partitioned, and
  - where each group of the pluralities of pass groups identifies a collection of files that can simultaneously fit into the I/O buffer with minimal unused buffer space; and
- the system initiating a multi-pass file-transfer procedure that transfers the fileset to the destination location in a sequential series of passes,
  - where each pass of the series of passes is configured to fully transfer all files comprised by one group of the pluralities of pass groups, and
  - where an interruption to the file-transfer procedure during a partially completed pass of the series of passes does not result in loss of any file transferred during a previous pass.

17. The computer program product of claim 16, where each performance of the second application of the KDE procedure is seeded with an initial kernel width equal to the fileset kernel width.

18. The computer program product of claim 16, where the passes are performed in an order that is determined as a function of a user-specified directive.

19. The computer program product of claim 16, where the system responds to the interruption with an action selected from the group consisting of:
- deleting, from the destination location, partially transferred files created during the partially completed pass,
- allowing partially transferred files transferred during the partially completed pass to remain at the destination location, and
- pausing the file-transfer procedure in a manner that allows the procedure to be resumed at a later time, starting with the partially completed pass.

20. The computer program product of claim 16, where a filesize of any file of the fileset identifies an amount of I/O buffer capacity that is required to store the any file in the I/O buffer.

* * * * *